May 19, 1970  A. M. HOWALD  3,512,294
FLY FISHING LINE HAVING IMPROVED ELASTIC MEMORY AND
IMPROVED ACTION IN CASTING
Filed Oct. 16, 1967

INVENTOR.
ARTHUR M. HOWALD
BY
Marshall & Yeasting
Attorneys

United States Patent Office 3,512,294
Patented May 19, 1970

3,512,294
FLY FISHING LINE HAVING IMPROVED ELASTIC MEMORY AND IMPROVED ACTION IN CASTING
Arthur M. Howald, Perrysburg, Ohio, assignor to Soo Valley Company, Columbia, S.C., a corporation of South Carolina
Filed Oct. 16, 1967, Ser. No. 675,366
Int. Cl. A01k 91/00; B44d 1/46
U.S. Cl. 43—44.98                            3 Claims

ABSTRACT OF THE DISCLOSURE

A fly fishing line comprising a filamentous core, surrounded by a flexible surface layer which consists essentially of plasticized polyvinyl chloride and comprises 5 to 20% by weight of a compatible cross-linked polymerized poly-unsaturated substance that improves the elastic memory of the line and improves its action in casting.

BACKGROUND OF THE INVENTION

This invention relates to a fly fishing line having improved physical properties.

In the art of fly fishing, the results obtained are dependent in large part upon the line used. In order to give satisfactory results, a fly fishing line must possess a number of critical properties which are essential because of the manner in which a fly fishing line is used.

A fly fishing line, ordinarily 90 feet in length, is used in casting a fly in order to drop the fly at the desired spot on the surface of the water.

A fly fishing line must float lightly on the surface of the water, so that the fisherman can pick the line cleanly off the water in order to make a new cast. At the same time, the line must have a sufficient weight per foot to permit the fisherman to cast the fly through the desired distance, since the weight of the fly itself may be regarded as negligible.

The physical properties that are necessary in a fly fishing line are highly critical. A fly fishing line must have sufficient stiffness and body so that it has the desired action in casting, and so that it tends to straighten out rather than to form loops or coils which would produce knots or tangles.

It has been common practice to produce fly fishing lines that consist of a filamentous core surrounded by a flexible surface layer of plasticized polyvinyl chloride. Such a fly fishing line is customarily manufactured by coating a braided nylon core with a surface layer consisting of a polyvinyl chloride plastisol. A polyvinyl chloride plastisol consists essentially of a suspension of finely divided polyvinyl chloride in a liquid phase that is made up of one or more plasticizers. The final step in the manufacture of such a line consists in heating to a temperature of about 350–380° F. When a polyvinyl chloride plastisol is heated to such a temperature, the polymer fuses and goes into solution in the plasticizer phase. The resulting solution of the polymer in the plasticizer, upon cooling, is no longer a liquid, but is a flexible solid surface layer surrounding the braided nylon core.

Considerable difficulty has been experienced in the manufacture of fly fishing lines consisting of a filamentous core surrounded by a flexible surface layer of plasticized polyvinyl chloride. In general, such lines have tended to be too flexible to give satisfactory action in casting. When changes in the composition of the initial plastisol have been made in an attempt to improve the physical properties of the final product, such changes in the initial plastisol have impaired the properties of the liquid plastisol so as to make it impossible to form the plastisol into a satisfactory coating upon the core.

SUMMARY OF THE INVENTION

The principal object of the invention is to provide a fly fishing line having excellent physical properties. More specific objects and advantages are apparent from the following detailed description, which is intended to disclose and illustrate but not to limit the invention.

The present invention is based upon the discovery that a fly fishing line having an excellent elastic memory, so that it tends to straighten out, and having an excellent degree of stiffness can be produced by applying, as the surface layer surrounding a filamentous core, a polyvinyl chloride plastisol containing 5 to 20% by weight of a compatible polymerizable poly-unsaturated substance, and then carrying out cross linking of such substance by polymerization during fusing of the plastisol.

It has been discovered that the presence of the cross-linked polymerized poly-unsaturated substance in the surface layer of a fly fishing line embodying the present invention imparts an excellent elastic memory and an excellent degree of stiffness to the line, so that the line, while sufficiently flexible, tends to straighten out rather than to form loops or coils, and has an excellent action in casting.

DESCRIPTION OF THE PREFERRED EMBODIMENTS

Figure 1:
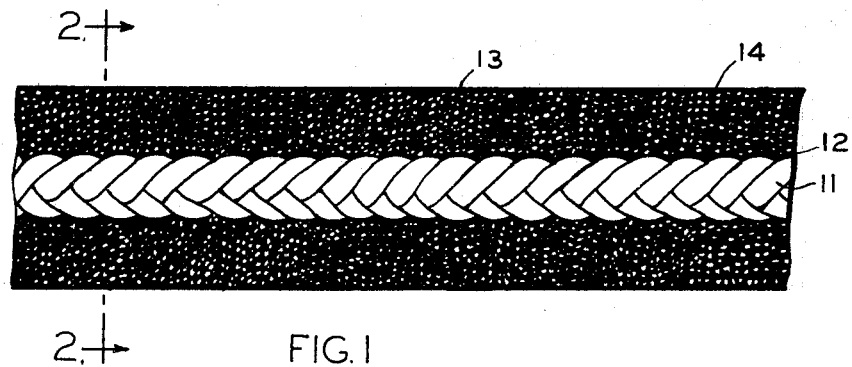
FIG. 1 of the drawing is a longitudinal section, on an enlarged scale, of a fly fishing line embodying the invention.
Figure 2:
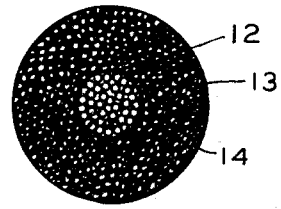
FIG. 2 is a transverse section on the line 2—2 of FIG. 1.

A fly fishing line embodying the present invention comprises a filamentous core surrounded by a flexible surface layer. The core may consist of a single filament or a multiplicity of filaments, and it preferably has substantially greater tensile strength and substantially less elongation than the material of the surface layer. When the core contains more than one filament, the filaments may be braided, twisted or laid side by side. The core may consist of nylon, Dacron, silk or any other suitable filamentous material. When the core has substantially greater total tensile strength and substantially less elongation than the surface layer of the line, it is the core which determines the tensile strength of the line, as well as the degree to which the line will stretch or elongate, because under a tensile load the surface layer tends to elongate freely and thus permits the core to take the load. Under such circumstances, the elongation or stretchability of the line is substantially that of the core, and the tensile strength of the line is substantially equal to that of the core. In that way, the core prevents the line from being excessively "soft" under tension, so as to enable the fisherman to set the hook by a jerk on the line after a fish has taken the fly.

Although the core may determine the tensile strength and elongation of the line, the core alone, before the addition of the surface layer, is much more flexible than is desirable in a fly fishing line. The necessary critical degree of flexibility is imparted to the present fly fishing line by the surface layer surrounding the core, and more particularly by the cross-linked polymerized poly-unsaturated substance in the surface layer.

When the core consists of a monofilament of nylon having a diameter more than about 0.12 inch, it is desirable that the nylon be a modified nylon of the type known as "limp nylon" which is sufficiently flexible so that the overall stiffness of the line will not be excessive.

Ordinarily the core is a multi-filament core, which is substantially more flexible than a monofilament core.

Before the surface layer is applied to the core, it is desirable to coat the core with a primer which improves the adherence of the surface layer to the core and insures the formation of a good bond between the surface layer and the core.

The primer should be applied in the form of a relatively non-viscous liquid which flows freely so as to wet the core thoroughly. The primer may consist of a solution of any synthetic resin that is compatible with the plastisol which is to be applied as the surface layer. For example, the primer may consist of a solution of a copolymer of vinyl chloride and vinyl acetate in methyl isobutyl ketone. Another primer which may be employed is an acrylonitrile-butadiene copolymer solution in methyl ethyl ketone or methyl isobutyl ketone.

If desired, the primer solution may be applied while hot, in order to increase the solubility of the synthetic resin in the solvent employed. The primer may be applied to the core in a continuous operation, by passing the core continuously through a tank of the primer and then exposing the core to radiant heat or to circulated hot air in order to evaporate the solvent from the primer and to remove moisture from the core.

After the core has been coated with a primer and dried, the surface layer is applied to the core in the form of a plastisol. The polymer in the plastisol used in the practice of the invention consists essentially of polymerized vinyl chloride, but the vinyl chloride used to form the polymer may be copolymerized with small proportions of other monomers, e.g., with a proportion of vinyl acetate equal to about one half of one percent of the weight of the vinyl chloride used. For example, 96% of the vinyl chloride may be present in the form of a homopolymer, and the other 4% of the vinyl chloride may be present in the form of a copolymer obtained by the copolymerization of 4 parts of vinyl acetate with 35 parts of vinyl chloride, the copolymer being dissolved in the plasticizer in which the fine particles of the homopolymer are suspended to form the plastisol.

A polymer for use in the plastisol may be prepared by emulsion polymerization. Preferably the polymer is in the form of a powder having a particle size of the order of one micron, which may be mixed with one or more plasticizers to produce a plastisol.

The plasticizers which may be employed include all of the plasticizers which are useful in the production of flexible polyvinyl chloride products. These known plasticizers include di-octyladipate, di-2-ethylhexyl phthalate, dicapryl phthalate, tricresyl phosphate and trioctyl phosphate.

Minor proportions of resin-type plasticizers also may be added to increase the viscosity of the plastisol and to obtain the desired properties in the finished product.

The proportion of plasticizers in the plastisol depends upon the particular plasticizers and the particular polymer used, and upon the amount of the poly-unsaturated substance in the composition and may vary from about 30 to about 60 parts of plasticizers to 100 parts of polyvinyl chloride.

In accordance with usual practice, the plastisol should contain from about one to about four parts of a stabilizer for each 100 parts of polyvinyl chloride. The stabilizer may be a substance which combines with hydrogen chloride liberated from the polyvinyl chloride, such as a lead soap. Other stabilizers which may be employed include soaps of zinc and cadmium.

Other modifiers, such as pigments or dyes, may be added in small proportions if desired, without affecting the quality of the final product.

In accordance with the invention, the plastisol consisting of the ingredients hereinbefore described is modified by incorporation in the plastisol, in an amount equal to 5–20% of the weight of the plastisol, of a polymerizable poly-unsaturated substance that is compatible with the plastisol. Examples of such a substance include the acrylic or methacrylic esters of a glycol, such as 1,3-butanediol dimethacrylate and trimethylol propane trimethacrylate. Ethylene glycol dimethacrylate and triethylene glycol dimethacrylate also may be employed.

Other examples of polymerizable poly-unsaturated substances include the vinyl or allyl esters of polybasic acids, and divinyl benzenes. Another example of such a substance is a polyester of an unsaturated polybasic acid such as maleic or fumaric acid, containing more than one unsaturated polybasic acid radical in the molecule. Various examples of polymerizable poly-unsaturated substances are found in U.S. Pat. No. 3,157,713 and British Pat. No. 997,172.

Such a polymerizable poly-unsaturated substance, when used in the plastisol, does not substantially increase the viscosity of the plastisol. The substances described, including polymerizable unsaturated polyesters of low molecular weight, are compatible with the plastisol and are readily incorporated therein.

In order to promote the polymerization and cross linking of the polymerizable poly-unsaturated substance, which occurs during the final fusing operation, it is sometimes advantageous to add to the plastisol a polymerization catalyst such as benzoyl peroxide or tertiary butyl perbenzoate, in an amount equal to about 1–2% of the weight of the polymerizable poly-unsaturated substance.

In order to cause a fly fishing line to float lightly upon the surface of the water, it is desirable to coat the line with a water-repellent dressing in order to cause the line to be held upon the surface of the water by surface tension. Also, the specific gravity of plasticized polyvinyl chloride is from about 1.2 to about 1.3. Therefore, in the production of a fly fishing line in which the surface layer consists of plasticized polyvinyl chloride, it is customary to reduce the specific gravity of the surface layer by forming gas bubbles in the surface layer or by incorporating hollow microspheres in the surface layer in order to produce a more buoyant line.

In the practice of the present invention, a cellular surface layer may be produced by incorporating in the plastisol a conventional blowing agent, as described in U.S. Pat. No. 2,862,282. During the fusing operation the blowing agent decomposes to liberate a gas such as nitrogen. The blowing agent is dispersed in the plastisol in the form of fine particles, so that in the finished product a gas bubble may be present in the vicinity of each particle, although the gas bubbles generated by a number of particles may merge to form a single gas bubble. In this way it is possible to produce a fly fishing line having an average specific gravity less than 1.0.

Another method of producing a fly fishing line embodying the present invention which has reduced specific gravity consists in incorporation in the plastisol, before the plastisol is applied to the core, of hollow microspheres such as glass microballoons, as described in U.S. Pat. No. 3,043,045.

The glass microballoons may be produced as described in U.S. Pat. Nos. 2,978,339 and 2,978,340. The composition of the glass preferably consists of oxides of an alkali metal and silica, together with small proportions of other oxides, such as an oxide of boron. The molar proportion of silica in the glass preferably is greater than the molar proportion of sodium or other alkali metal, and preferably is at least three times as great.

The diameter of the glass microballoons may be of the order of 10 to 270 microns and the average diameter may be of the order of 100 microns. The wall thickness of the microballoons is of the order of one percent of the diameter.

The proportion of glass microballoons to be dispersed in the plastisol depends upon the initial density of the plastisol and upon the final density desired. Usually the specific gravity of the plastisol is about 1.2 to 1.3, so that the incorporation of 10–11% by weight of the glass microballoons in the plastisol will bring the specific gravity of the composition to about 0.95.

A braided nylon core usually is hollow in form and therefore contributes to the buoyancy of the line.

The fly fishing line of the present invention may be produced from a core and a plastisol by means of the apparatus disclosed in U.S. Pat. No. 2,862,282. In the operation of that apparatus, the core is passed continuously through a tank containing a plastisol. The core, which becomes coated with a relatively thick layer of the plastisol, is drawn vertically out of the plastisol, and passes through an opening formed at the line of contact of two rollers which have circumferential grooves that register to form a passage between the two rollers at the line of contact. In that apparatus, the size of the opening or passage between the rollers at the line of contact may be varied gradually as the operation proceeds. The diameter of the finished product is determined by the diameter of the opening through which the coated core is drawn between the rollers. In order to produce a tapered fly fishing line embodying the invention, the diameter of the opening between the rollers is varied gradually as the coated core passes between the rollers, thus varying the thickness of the layer of plastisol surrounding the core so as to provide the desired taper.

Preferably the diameter of the core itself is uniform throughout the length of the line.

A line which has been prepared by the procedure hereinbefore described is in its final form, except that the surface layer consists of a relatively soft plastisol. In order to harden the surface layer, the line is then heated to a temperature between 350 and 380° F., preferably by passing the coated core continuously through an oven in which it is subjected to radiant heat.

During this heating operation, the polymerizable poly-unsaturated substance is cross linked by polymerization, and the polyvinyl chloride is fused so as to convert the plastisol to a solution of the polyvinyl chloride in the plasticizers. The length of time during which the line is held at a temperature between 350 and 380° F. may vary from 1 to 10 minutes, depending upon the exact temperature used.

The drawing shows a finished product embodying the invention, in which a braided core 11 composed of a multiplicity of filaments is coated with a thin layer of a primer 12 which forms the boundary between the core 11 and the surface layer 13. Microballoons 14 are dispersed throughout the surface layer.

A typical example of a fly fishing line embodying the invention consists of a braided nylon core having a diameter of .025 inch and a total breaking strength of 15 pounds, surrounded by a surface layer having the following composition:

| | Parts |
|---|---|
| Polyvinyl chloride (Geon 121) | 100 |
| Di-octyladipate | 38 |
| Epoxidized tall oil (Flexol EP8) | 10 |
| Lead soap | 3 |
| Polymerized polyacrylate (Monoplex X–970) | 15 |

(In the foregoing tabulation, the parts are by weight. The amount of the polyacrylate may be varied from 7 to 45 parts.)

In addition to the above ingredients, the surface layer has dispersed therein glass microballoons having an average diameter of about 100 microns, which make up about 30% of the volume of the surface layer. The line is 90 feet in length, and consists of a middle portion 72 feet long having an overall diameter of .045 inch, with tapered portions at both ends which are 9 feet long and the diameter of which varies gradually from .03 inch at the end to the maximum diameter of .045 inch which begins 9 feet from each end.

If a line of higher tensile strength is desired, a core having a total breaking strength of 20 or 25 pounds may be used. The other properties and dimensions of the line may be varied as desired to meet various requirements.

What I claim is:

1. A fly fishing line, of a length and thickness suitable for casting, which has an improved elastic memory giving the line a tendency to straighten out rather than to form coils, and has an improved action in casting, comprising a filamentous core surrounded by a flexible surface layer consisting essentially of fused polyvinyl chloride containing from 30 to 60 parts, per 100 parts of polyvinyl chloride, of at least one plasticizer of the class consisting of di-octyladipate, di-2-ethylhexylphthalate, dicapryl phthalate, tricresyl phosphate and trioctyl phosphate, and also containing, in an amount equal to 5 to 20% of the weight of the surface layer, a compatible crosslinked polymerized poly-unsaturated substance of the class consisting of acrylic and methacrylic esters of a glycol, divinyl benzenes, maleic acid polyesters and fumaric acid polyesters.

2. A fly fishing line according to claim 1 which is from .03 to .045 inch in diameter and 90 feet in length.

3. A fly fishing line according to claim 1 wherein the polymerized substance is a methacrylic ester of a glycol.

References Cited

UNITED STATES PATENTS

| | | | |
|---|---|---|---|
| 2,606,845 | 8/1952 | Etten | 117—138.8 X |
| 2,862,282 | 12/1958 | Beebe | 43—44.98 |
| 2,868,676 | 1/1959 | Ljungbo | 117—138.8 |
| 2,961,343 | 11/1960 | Atwell | 117—72 |
| 3,043,045 | 7/1962 | Martuch | 43—44.98 |
| 3,157,713 | 11/1964 | Leese | 117—161 X |
| 3,202,541 | 8/1965 | Hochberg | 117—161 X |
| 3,278,477 | 10/1966 | Evans | 117—161 X |

FOREIGN PATENTS

| | | |
|---|---|---|
| 898,480 | 6/1962 | Great Britain. |
| 911,800 | 11/1962 | Great Britain. |
| 997,172 | 7/1965 | Great Britain. |

WILLIAM D. MARTIN, Primary Examiner

M. R. P. PERRONE, Jr., Assistant Examiner

U.S. Cl. X.R.

117—72, 141, 138.8, 161